(12) United States Patent
Hsiung (10) Patent No.: US 8,414,128 B2
(45) Date of Patent: Apr. 9, 2013

(54) OPTICAL PROJECTION DEVICE AND PROJECTING METHOD THEREOF WITH MOVABLE WAVE PLATE

(75) Inventor: Chien-Chih Hsiung, Taichung (TW)

(73) Assignee: Asia Optical International Ltd., Tortola (VG)

( * ) Notice: Subject to any disclaimer, the term of this patent is extended or adjusted under 35 U.S.C. 154(b) by 240 days.

(21) Appl. No.: 12/849,328

(22) Filed: Aug. 3, 2010

(65) Prior Publication Data

US 2011/0032485 A1 Feb. 10, 2011

(30) Foreign Application Priority Data

Aug. 4, 2009 (TW) .............................. 98126152 A (51) Int. Cl.
- *G03B 21/14* (2006.01)
- *G03B 21/28* (2006.01)
- *G02F 1/00* (2006.01)
- *G02B 27/28* (2006.01)
- *F21V 9/14* (2006.01)

(52) U.S. Cl.
USPC .............. 353/20; 353/33; 353/81; 353/121; 348/752; 359/487.04; 359/485.01; 359/489.07; 362/19

(58) Field of Classification Search ................... 353/20, 353/33, 81, 121; 348/752; 359/487.04, 485.01, 359/489.07; 362/19

See application file for complete search history.

(56) References Cited

U.S. PATENT DOCUMENTS 3,707,321 A * 12/1972 Jaecklin et al. ............... 359/282
2010/0171927 A1 * 7/2010 Kitano et al. .................. 353/20

FOREIGN PATENT DOCUMENTS

JP 2004258063 A * 9/2004

* cited by examiner

*Primary Examiner* — Georgia Y Epps
*Assistant Examiner* — Magda Cruz
(74) *Attorney, Agent, or Firm* — McClure, Qualey & Rodack, LLP (57) ABSTRACT

An optical projection device includes a laser engine, a first wave plate and a lens. The laser engine provides light. The first wave plate changes a light phase. The lens focuses light. A projecting method of an optical projection device includes providing a light including a first P polarized light, a first S polarized light, and a second S polarized light, and projecting light through a wave plate on a screen, wherein the wave plate moves in a direction perpendicular to light. A projecting method of an optical projection device includes providing light including a first P polarized light, a first S polarized light, and a second S polarized light, and projecting light through a wave plate on a screen, wherein the wave plate rotates around an axis parallel to a projecting direction of light.

9 Claims, 9 Drawing Sheets

OPTICAL PROJECTION DEVICE AND PROJECTING METHOD THEREOF WITH MOVABLE WAVE PLATE

CROSS REFERENCE TO RELATED APPLICATIONS

This Application claims priority of Taiwan Patent Application No. 098126152, filed on Aug. 4, 2009, the entirety of which is incorporated by reference herein.

BACKGROUND OF THE INVENTION

1. Field of the Invention

The present invention relates to an optical projection device and a projecting method thereof, and more particularly, to an optical projection device and a projecting method thereof utilizing a movable wave plate or a rotatable wave plate to equalize the laser energy and preventing interference speckle on screens.

2. Description of the Related Art

Figure 1:
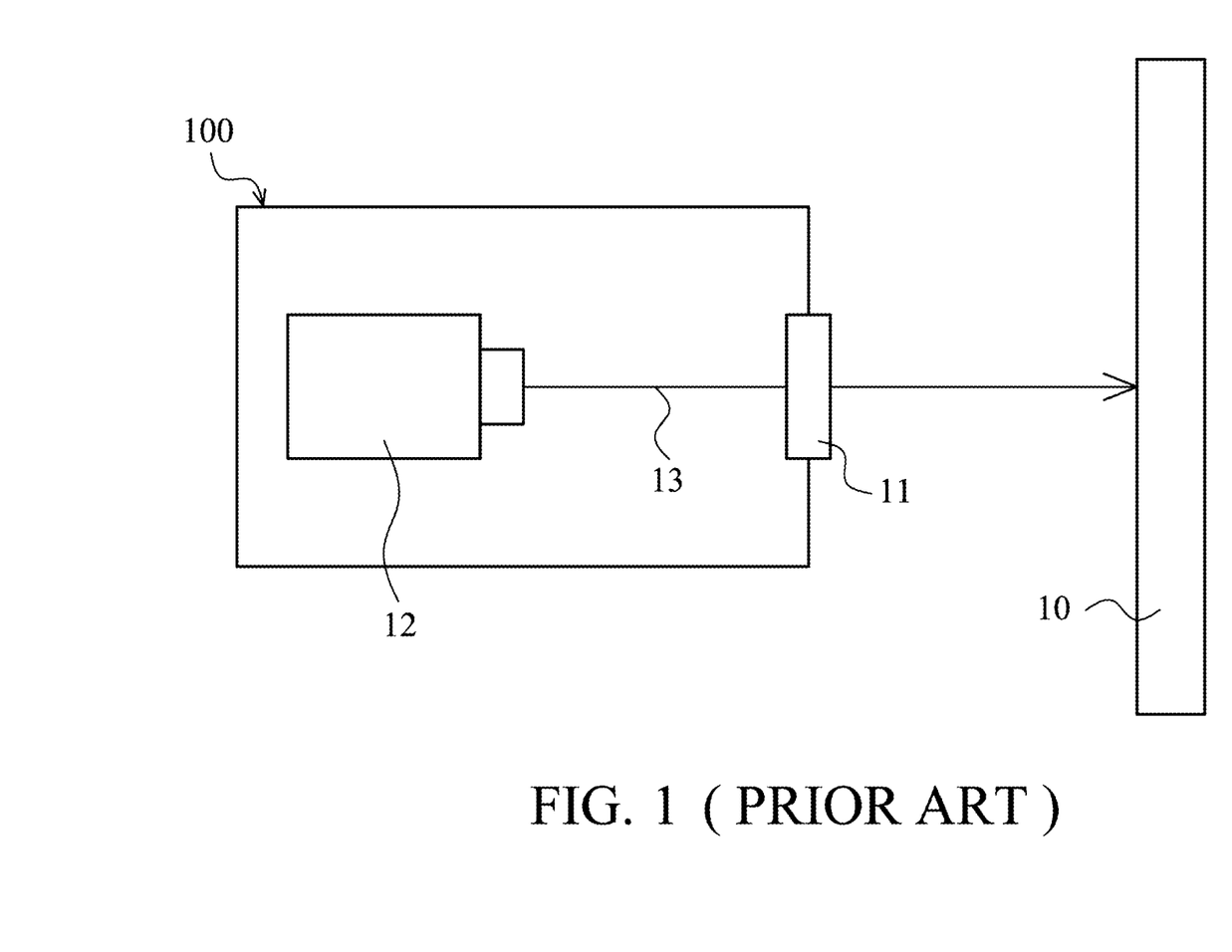
FIG. 1 is a schematic view of a conventional optical projection device.

FIG. 1 is a schematic view of a conventional optical projection device. The conventional optical projection device 100 comprises a lens 11 and a laser engine 12. The laser engine 12 generates light 13. After passing through the lens 11, an image is projected on the screen 10.

However, in the conventional optical projection device 100, the path of light 13 from the laser engine 12 to the screen 10 is not changed. Thus, the interference position of light is not changed, that is, the interference speckle is also not changed. Thus, the interference speckle of the conventional optical projection device 100 is very conspicuous.

BRIEF SUMMARY OF THE INVENTION

The present invention provides an optical projection device. The optical projection device includes a laser engine, a first wave plate, a screen and a lens. The laser engine generates light. The first wave plate changes a light phase and the lens focuses light on the screen.

Note that the lens is disposed between the screen and the first wave plate.

Note that the first wave plate is disposed between the screen and the lens.

Note that light comprises a first P polarized light, a first S polarized light, and a second S polarized light. After light passes through the first wave plate, the first P polarized light is transformed to a third S polarized light, the first S polarized light is transformed to a second P polarized light, and the second S polarized light is transformed to a third P polarized light.

Note that the laser engine comprises an X-Prism, a second wave plate, a first polarized light generator, a second polarized light generator, and a third polarized light generator. The first polarized light generator generates a fourth S polarized light to pass through the second wave plate to generate a fourth P polarized light. The second polarized light generator generates a fifth S polarized light. The third polarized light generator generates a sixth S polarized light. The fourth P polarized light, the fifth S polarized light and the sixth S polarized light are integrated into light by the X-Prism.

Note that the first polarized light generator comprises a green laser source, a first polarized spectroscope and a first reflecting panel. The green laser source generates a green laser to pass through the first polarized spectroscope to generate a fifth P polarized light. The fifth P polarized light is reflected by the first reflecting panel to generate a seventh S polarized light. The seventh S polarized light is reflected by the first polarized spectroscope to generate the fourth S polarized light.

Note that the second polarized light generator comprises a blue laser source, a second polarized spectroscope and a second reflecting panel. The blue laser source generates a blue laser to pass through the second polarized spectroscope to generate a sixth P polarized light. The sixth P polarized light is reflected by the second reflecting panel to generate an eighth S polarized light. The eighth S polarized light is reflected by the second polarized spectroscope to generate the fifth S polarized light.

Note that the third polarized light generator comprises a red laser source, a third polarized spectroscope and a third reflecting panel. The red laser source generates a red laser to pass through the third polarized spectroscope to generate a seventh P polarized light. The seventh P polarized light is reflected by the third reflecting panel to generate an ninth S polarized light. The ninth S polarized light is reflected by the third polarized spectroscope to generate the sixth S polarized light.

The present invention provides a projecting method of an optical projection device. The steps comprises: providing light including a first P polarized light, a first S polarized light, and a second S polarized light; projecting light through a wave plate on a screen; and moving the wave plate in a direction perpendicular to light.

Note that light passes through a lens and then passes through the wave plate.

Note that light passes through the wave plate, then passes through a lens, and then projects on the screen.

The present invention provides a projecting method of an optical projection device. The steps comprises: providing light including a first P polarized light, a first S polarized light, and a second S polarized light; projecting light through a wave plate on a screen; and rotating the wave plate around an axle parallel to a projecting direction of light.

Note that light passes through a lens and then passes through the wave plate.

Note that light passes through the wave plate, then passes through a lens, and then projects on the screen.

The present invention can be more fully understood by reading the subsequent detailed description and examples with references made to the accompanying drawings, wherein:

DETAILED DESCRIPTION OF THE INVENTION

Figure 2:
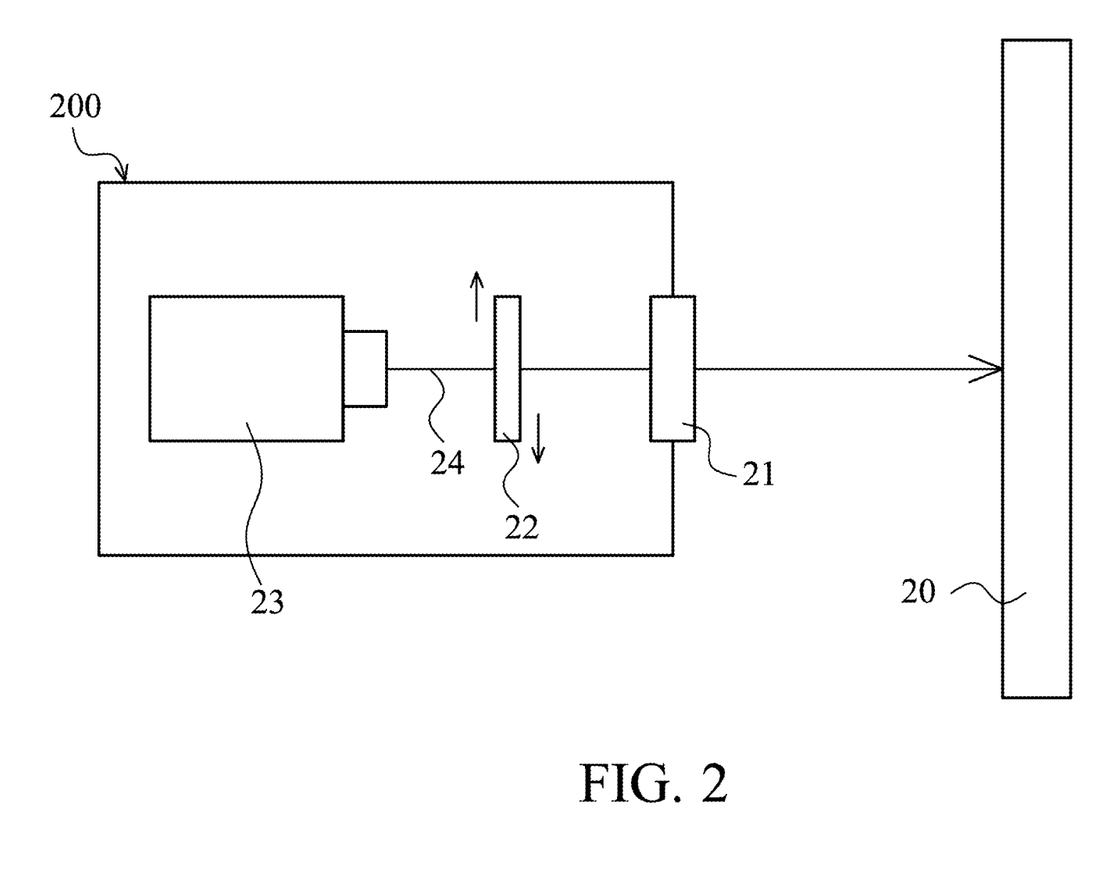
FIG. 2 is a schematic view of an optical projection device of an embodiment of the invention.
Figure 3:
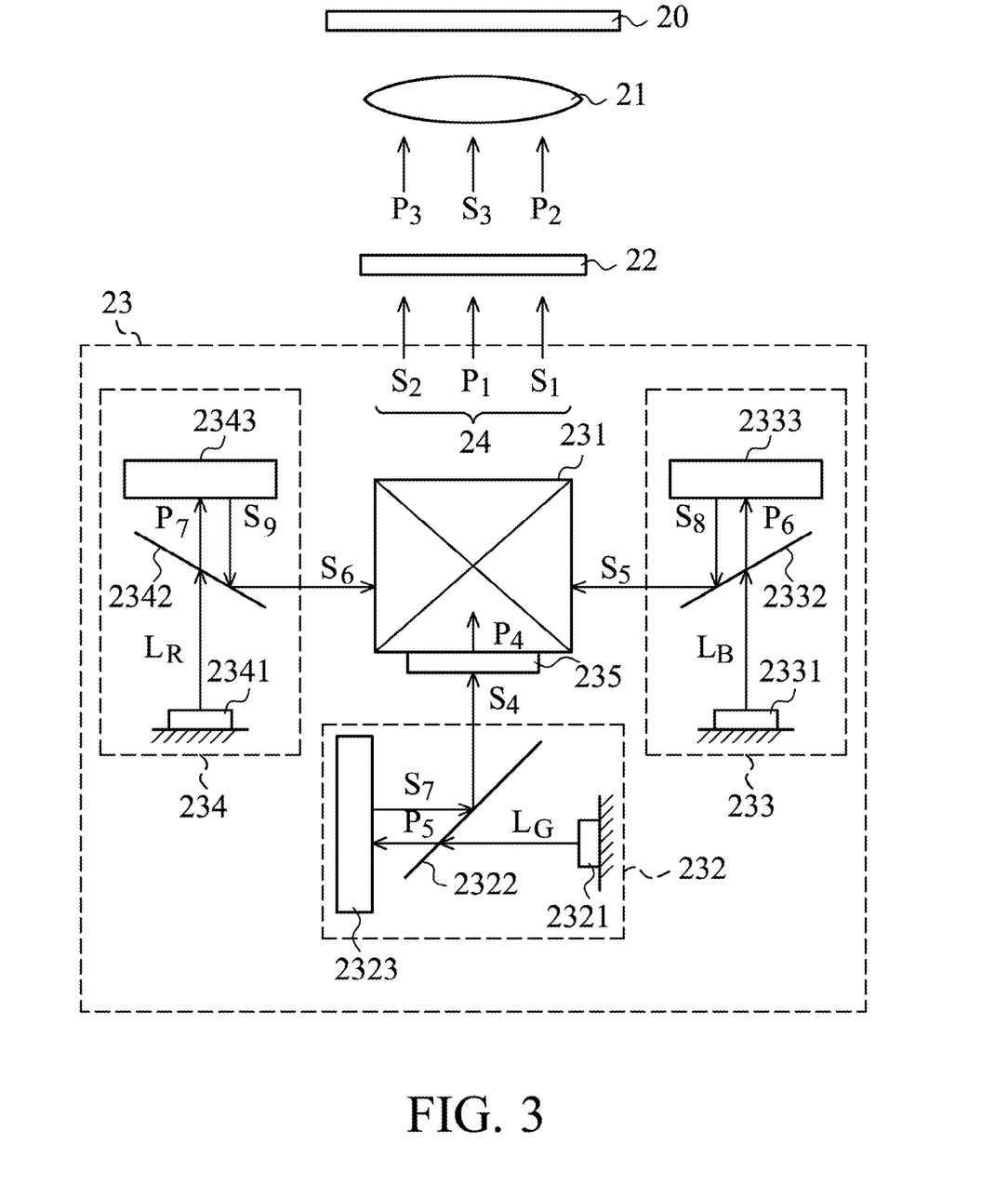
FIG. 3 is a block diagram of an optical projection device of an embodiment of the invention.

FIG. 2 is a schematic view of an optical projection device of an embodiment of the invention. The optical projection device 200 comprises a lens 21, a first wave plate 22 and a laser engine 23. The laser engine 23 generates light 24 to pass through the first wave plate 22 and the lens 21, forming into an image on a screen 20. The first wave plate 22 moves up and down by a motor (not shown) during operation to equalize the laser energy and prevent interference speckles on the screen 20. Referring to FIG. 3, the laser engine 23 comprises an X-prism 231, a first polarized light generator 232, a second polarized light generator 233, a third polarized light generator 234 and a second wave plate 235. The elements of the optical projection device 200 are described as follows.

The first polarized light generator 232 comprises a green laser source 2321 to generate a green laser $L_G$ to pass through a first polarized spectroscope 2322 to generate a P polarized light $P_5$ reflected by a first reflecting panel 2323 to generate an S polarized light $S_7$. The S polarized light $S_7$ is reflected by the first polarized spectroscope 2322 to generate a P polarized light $P_4$. The P polarized light $P_4$ is transmitted from the first polarized light generator 232 to the second wave plate 235, and then passes through the second wave plate 235 to transform into a P polarized light $P_4$ and then enter the X-prism 231.

The second polarized light generator 233 comprises a blue laser source 2331 to generate a blue laser $L_B$ to pass through a second polarized spectroscope 2332 to generate a P polarized light $P_6$ reflected by a second reflecting panel 2333 to generate an S polarized light $S_8$. The S polarized light $S_8$ is reflected by the second polarized spectroscope 2332 to generate an S polarized light $S_5$. The S polarized light $S_5$ is transmitted from the second polarized light generator 233 to the X-prism 231, and enters the X-prism 231.

The third polarized light generator 234 comprises a red laser source 2341 to generate a red laser $L_R$ to pass through a third polarized spectroscope 2342 to generate a P polarized light $P_7$ reflected by a third reflecting panel 2343 to generate an S polarized light $S_9$. The S polarized light $S_9$ is reflected by the third polarized spectroscope 2342 to generate an S polarized light $S_6$. The S polarized light $S_6$ is transmitted from the third polarized light generator 234 to the X-prism 231, and enters the X-prism 231.

The X-prism 231 integrates the P polarized light $P_4$ generated by the first polarized light generator 232, the S polarized light $S_5$ generated by the second polarized light generator 233 and the S polarized light $S_6$ generated by the third polarized light generator 234 into light to radiate. Light 24 comprises a P polarized light $P_1$, an S polarized light $S_1$, and an S polarized light $S_2$.

After light 24 radiated by the laser engine 23 passes through the first wave plate 22, the P polarized light $P_1$ is transformed to an S polarized light $S_3$, the S polarized light $S_1$ is transformed to a P polarized light $P_2$, and the S polarized light $S_2$ is transformed to a P polarized light $P_3$. Finally, light 24 is focused on the screen 20 by the lens 21.

During operation, the optical projection device 200 utilizes the first wave plate 22 to quickly move to change the angle between the light 24 and the axle of the first wave plate 22, to change the direction of the electric field when light 24 moves. Thus, laser energy is equalized following variations of the interference position. Further, the interference speckle on the screen 20 is eliminated. Moreover, providing the laser source can reduce the quantity of the optical elements and the volume of the projector. Cost is decreased and the efficiency of production and assembly is increased.

Figure 4:
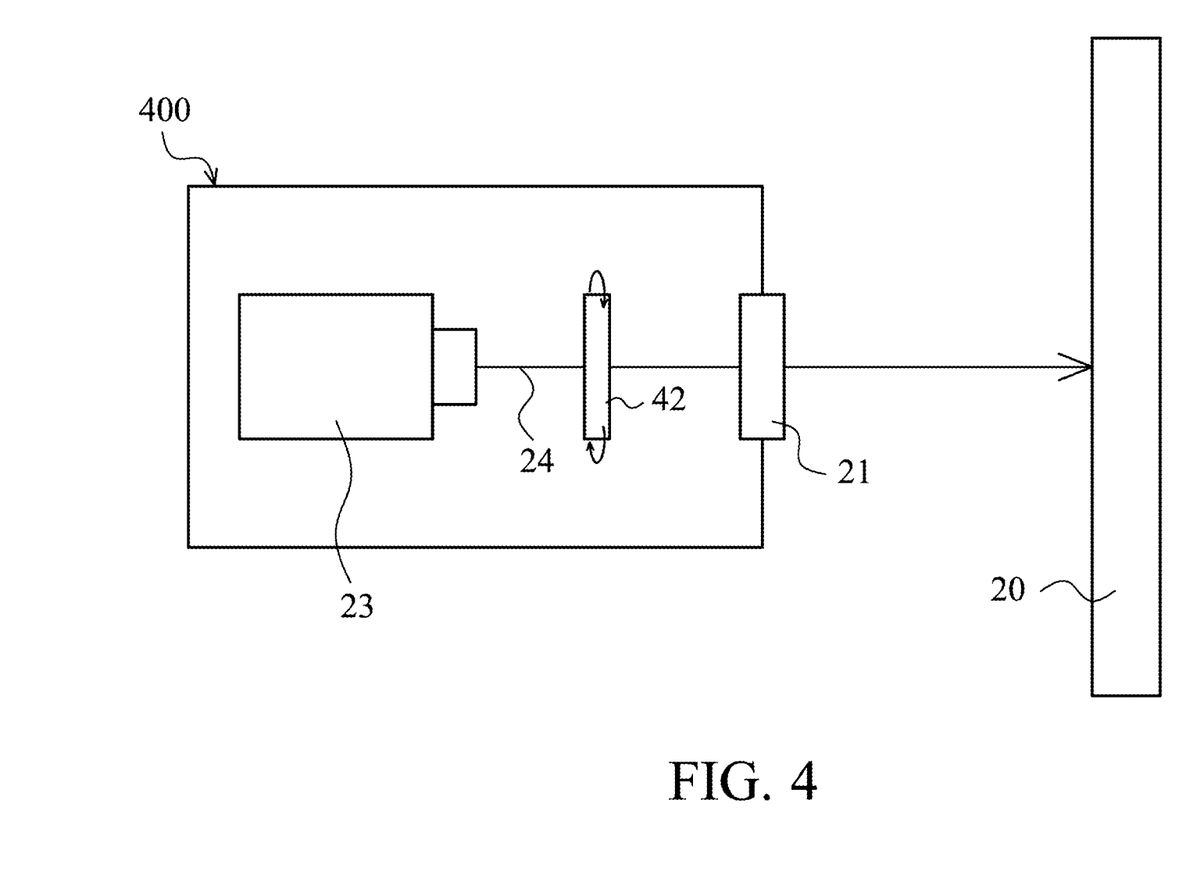
FIG. 4 is a schematic view of an optical projection device of another embodiment of the invention.
Figure 5:
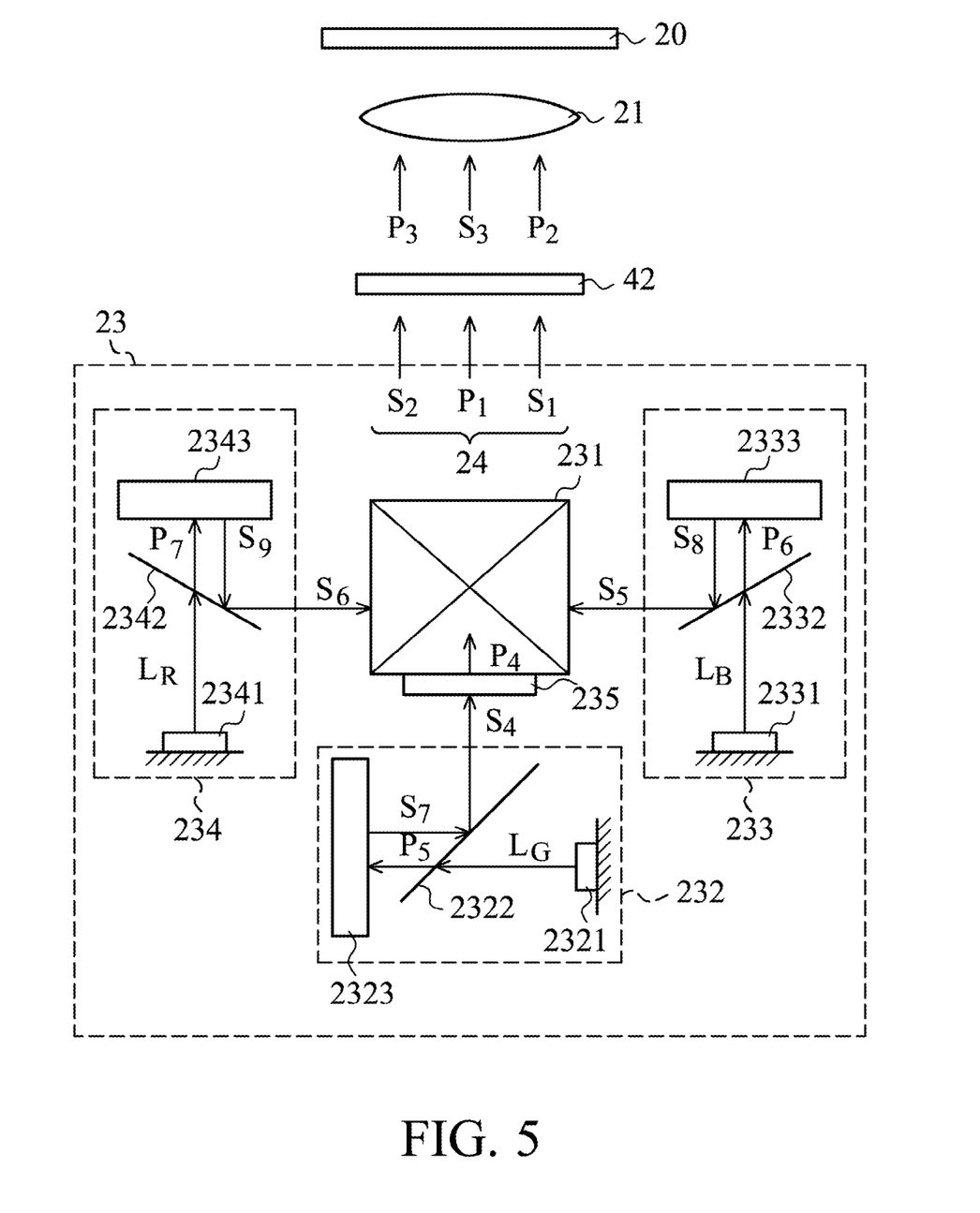
FIG. 5 is a block diagram of an optical projection device of another embodiment of the invention.

FIG. 4 is a schematic view of an optical projection device of another embodiment of the invention. The optical projection device 400 comprises a lens 21, a first wave plate 42 and a laser engine 23. The laser engine 23 generates light 24 to pass through the first wave plate 42 and the lens 21, forming into an image on a screen 20. The first wave plate 42 rotates around an axle parallel to a projecting direction of light 24 by a motor (not shown) to equalize the laser energy and delete the interference speckle on the screen 20. Referring to FIG. 5, the laser engine 23 comprises an X-prism 231, a first polarized light generator 232, a second polarized light generator 233, a third polarized light generator 234 and a second wave plate 235. The elements of the laser engine 23 are described as follows.

The first polarized light generator 232 comprises a green laser source 2321 to generate a green laser $L_G$ to pass through a first polarized spectroscope 2322 to generate a P polarized light $P_5$ reflected by a first reflecting panel 2323 to generate an S polarized light $S_7$. The S polarized light $S_7$ is reflected by the first polarized spectroscope 2322 to generate a P polarized light $P_4$. The P polarized light $P_4$ is transmitted from the first polarized light generator 232 to the second wave plate 235, and then passes through the second wave plate 235 to transform into a P polarized light $P_4$ and then enter the X-prism 231.

The second polarized light generator 233 comprises a blue laser source 2331 to generate a blue laser $L_B$ to pass through a second polarized spectroscope 2332 to generate a P polarized light $P_6$ reflected by a second reflecting panel 2333 to generate an S polarized light $S_8$. The S polarized light $S_8$ is reflected by the second polarized spectroscope 2332 to generate an S polarized light $S_5$. The S polarized light $S_5$ is transmitted from the second polarized light generator 233 to the X-prism 231, and enters the X-prism 231.

The third polarized light generator 234 comprises a red laser source 2341 to generate a red laser $L_R$ to pass through a third polarized spectroscope 2342 to generate a P polarized light $P_7$ reflected by a third reflecting panel 2343 to generate an S polarized light $S_9$. The S polarized light $S_9$ is reflected by the third polarized spectroscope 2342 to generate an S polarized light $S_6$. The S polarized light $S_6$ is transmitted from the third polarized light generator 234 to the X-prism 231, and enters the X-prism 231.

The X-prism 231 integrates the P polarized light $P_4$ generated by the first polarized light generator 232, the S polarized light $S_5$ generated by the second polarized light generator 233 and the S polarized light $S_6$ generated by the third polarized light generator 234 into light to radiate. Light 24 comprises a P polarized light $P_1$, an S polarized light $S_1$, and an S polarized light $S_2$.

After light 24 radiated by the laser engine 23 passes through the first wave plate 22, the P polarized light $P_1$ is transformed to an S polarized light $S_3$, the S polarized light $S_1$ is transformed to a P polarized light $P_2$, and the S polarized light $S_2$ is transformed to a P polarized light $P_3$. Finally, light 24 is focused on the screen 20 by the lens 21.

During operation, the optical projection device 400 utilizes the first wave plate 42 to quickly move to change the angle between the light 24 and the axle of the first wave plate 42, to change the direction of the electric field when light 24 moves. Thus, laser energy is equalized following variations of the interference position. Further, the interference speckle on the screen 20 is eliminated. Moreover, providing the laser source can reduce the quantity of the optical elements and the volume of the projector. Cost is decreased and the efficiency of production and assembly is increased.

Figure 6:
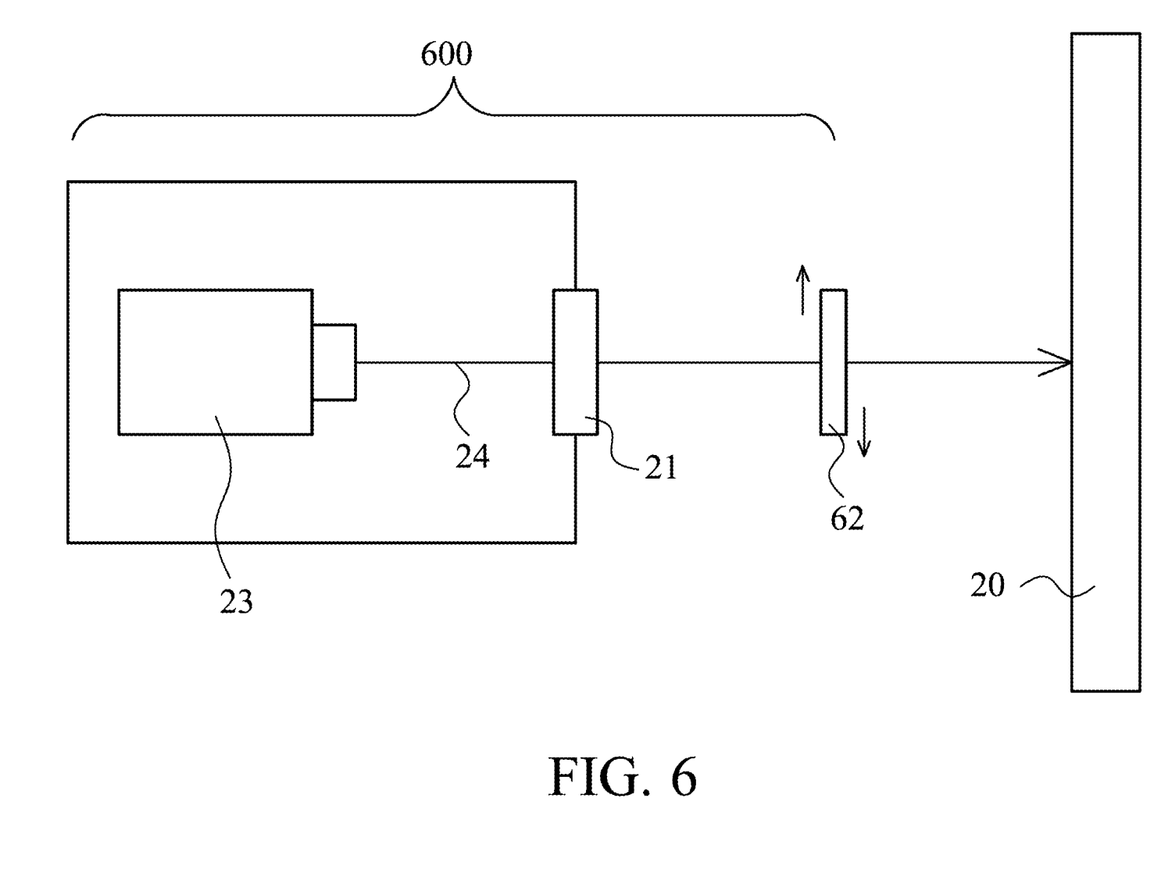
FIG. 6 is a schematic view of an optical projection device of another embodiment of the invention.
Figure 7:
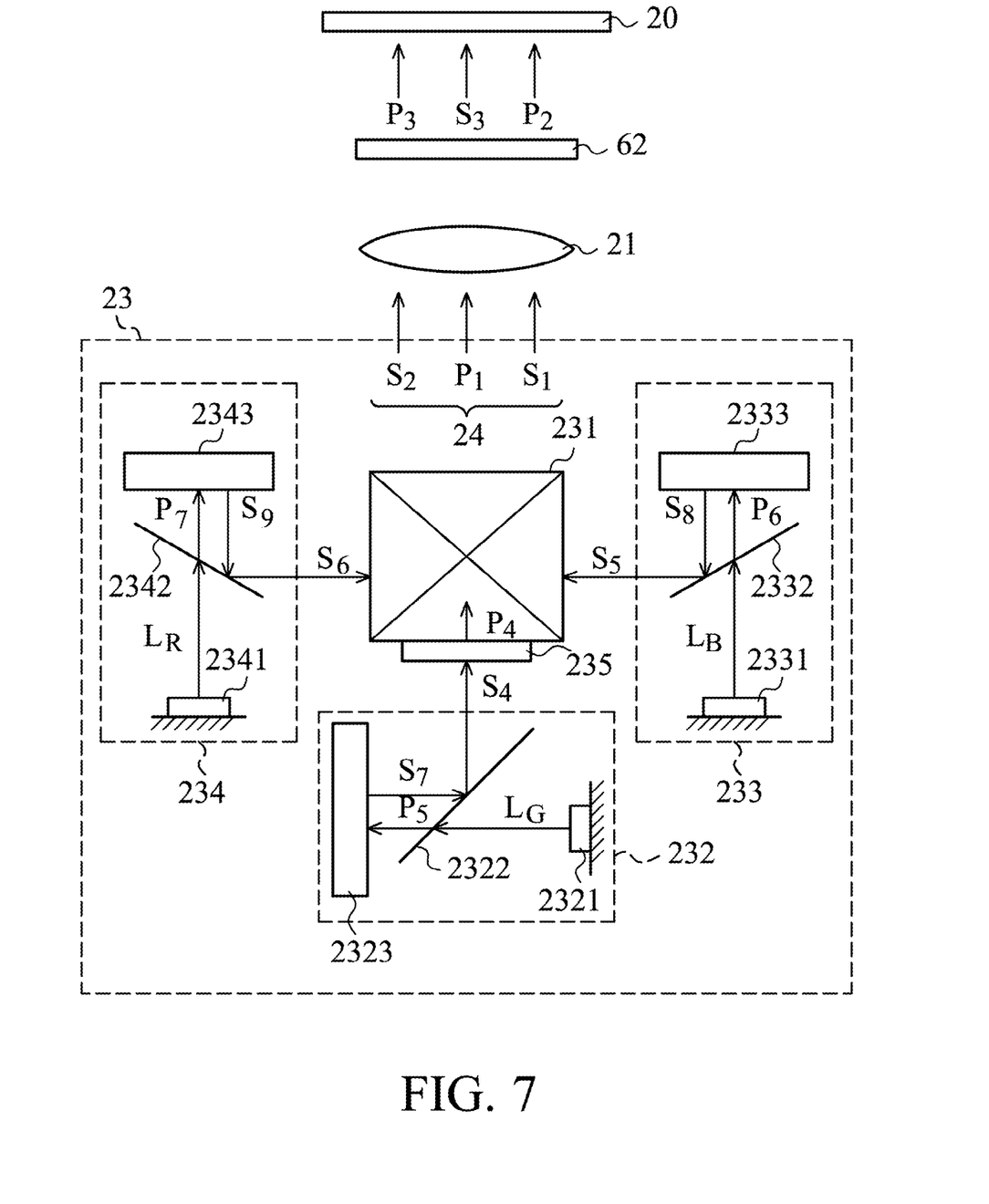
FIG. 7 is a block diagram of an optical projection device of another embodiment of the invention.

FIG. 6 is a schematic view of an optical projection device of another embodiment of the invention. The optical projection device 600 comprises a lens 21, a first wave plate 62 and a laser engine 23. The laser engine 23 generates light 24 to pass through the first wave plate 62 and the lens 21, forming into an image on a screen 20. The first wave plate 62 moves up and down by a motor (not shown) during operation to equalize the laser energy and prevent interference speckles on the screen 20. Referring to FIG. 7, the laser engine 23 comprises an X-prism 231, a first polarized light generator 232, a second polarized light generator 233, a third polarized light generator 234 and a second wave plate 235. The elements of the laser engine 23 are described as follows.

The first polarized light generator 232 comprises a green laser source 2321 to generate a green laser $L_G$ to pass through a first polarized spectroscope 2322 to generate a P polarized light $P_5$ reflected by a first reflecting panel 2323 to generate an S polarized light $S_7$. The S polarized light $S_7$ is reflected by the first polarized spectroscope 2322 to generate a P polarized light $P_4$. The P polarized light $P_4$ is transmitted from the first polarized light generator 232 to the second wave plate 235, and then passes through the second wave plate 235 to transform into a P polarized light $P_4$ and then enter the X-prism 231.

The second polarized light generator 233 comprises a blue laser source 2331 to generate a blue laser $L_B$ to pass through a second polarized spectroscope 2332 to generate a P polarized light $P_6$ reflected by a second reflecting panel 2333 to generate an S polarized light $S_8$. The S polarized light $S_8$ is reflected by the second polarized spectroscope 2332 to generate an S polarized light $S_5$. The S polarized light $S_5$ is transmitted from the second polarized light generator 233 to the X-prism 231, and enters the X-prism 231.

The third polarized light generator 234 comprises a red laser source 2341 to generate a red laser $L_R$ to pass through a third polarized spectroscope 2342 to generate a P polarized light $P_7$ reflected by a third reflecting panel 2343 to generate an S polarized light $S_9$. The S polarized light $S_9$ is reflected by the third polarized spectroscope 2342 to generate an S polarized light $S_6$. The S polarized light $S_6$ is transmitted from the third polarized light generator 234 to the X-prism 231, and enters the X-prism 231.

The X-prism 231 integrates the P polarized light $P_4$ generated by the first polarized light generator 232, the S polarized light $S_5$ generated by the second polarized light generator 233 and the S polarized light $S_6$ generated by the third polarized light generator 234 into light to radiate. Light 24 comprises a P polarized light $P_1$, an S polarized light $S_1$, and an S polarized light $S_2$.

After light 24 radiated by the laser engine 23 passes through the lens 21 for focus, light 24 passes through the first wave plate 62 to transform the P polarized light $P_1$ to an S polarized light $S_3$, the S polarized light $S_1$ to a P polarized light $P_2$, and the S polarized light $S_2$ to a P polarized light $P_3$. Finally, an image is formed on the screen 20.

During operation, the optical projection device 600 utilizes the first wave plate 62 to quickly move to change the angle between the light 24 and the axle of the first wave plate 62, to change the direction of the electric field when light 24 moves. Thus, laser energy is equalized following variations of the interference position. Further, the interference speckle on the screen 20 is eliminated. Moreover, providing the laser source can reduce the quantity of the optical elements and the volume of the projector. Cost is decreased and the efficiency of production and assembly is increased.

Figure 8:
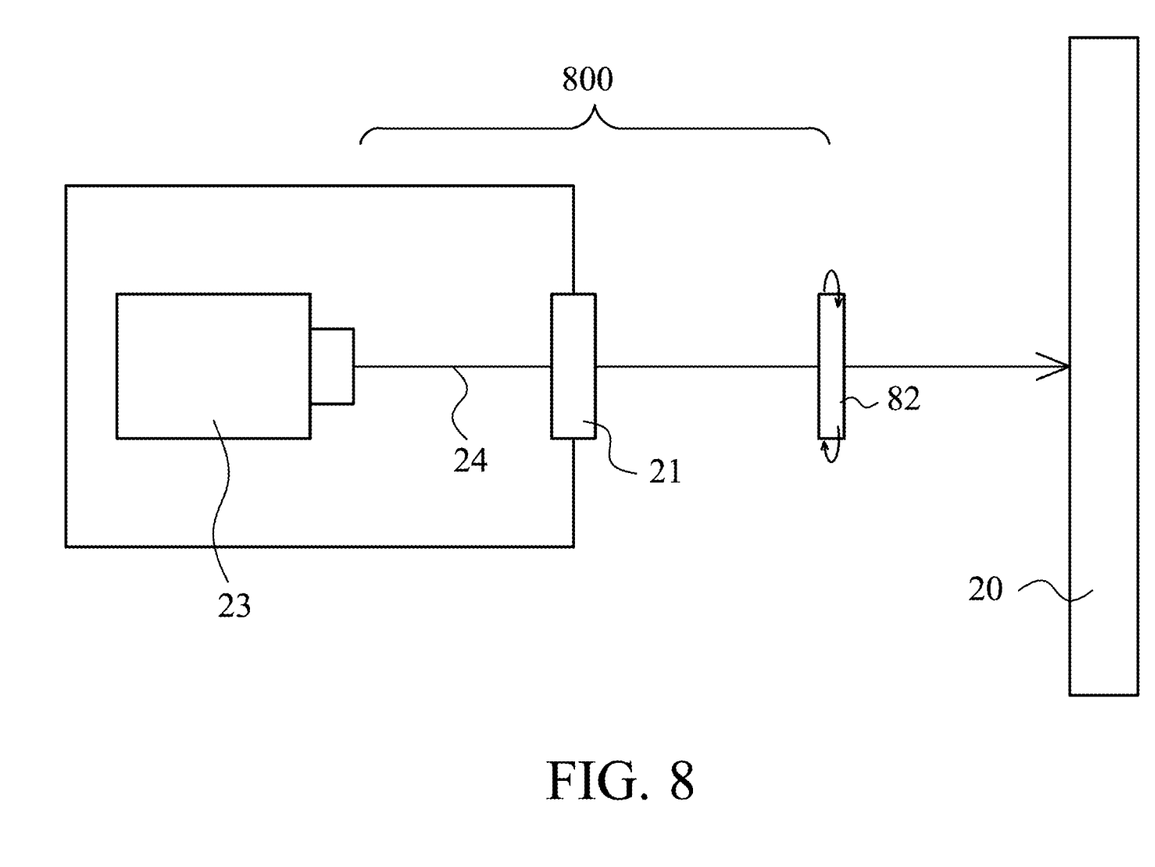
FIG. 8 is a schematic view of an optical projection device of another embodiment of the invention.
Figure 9:
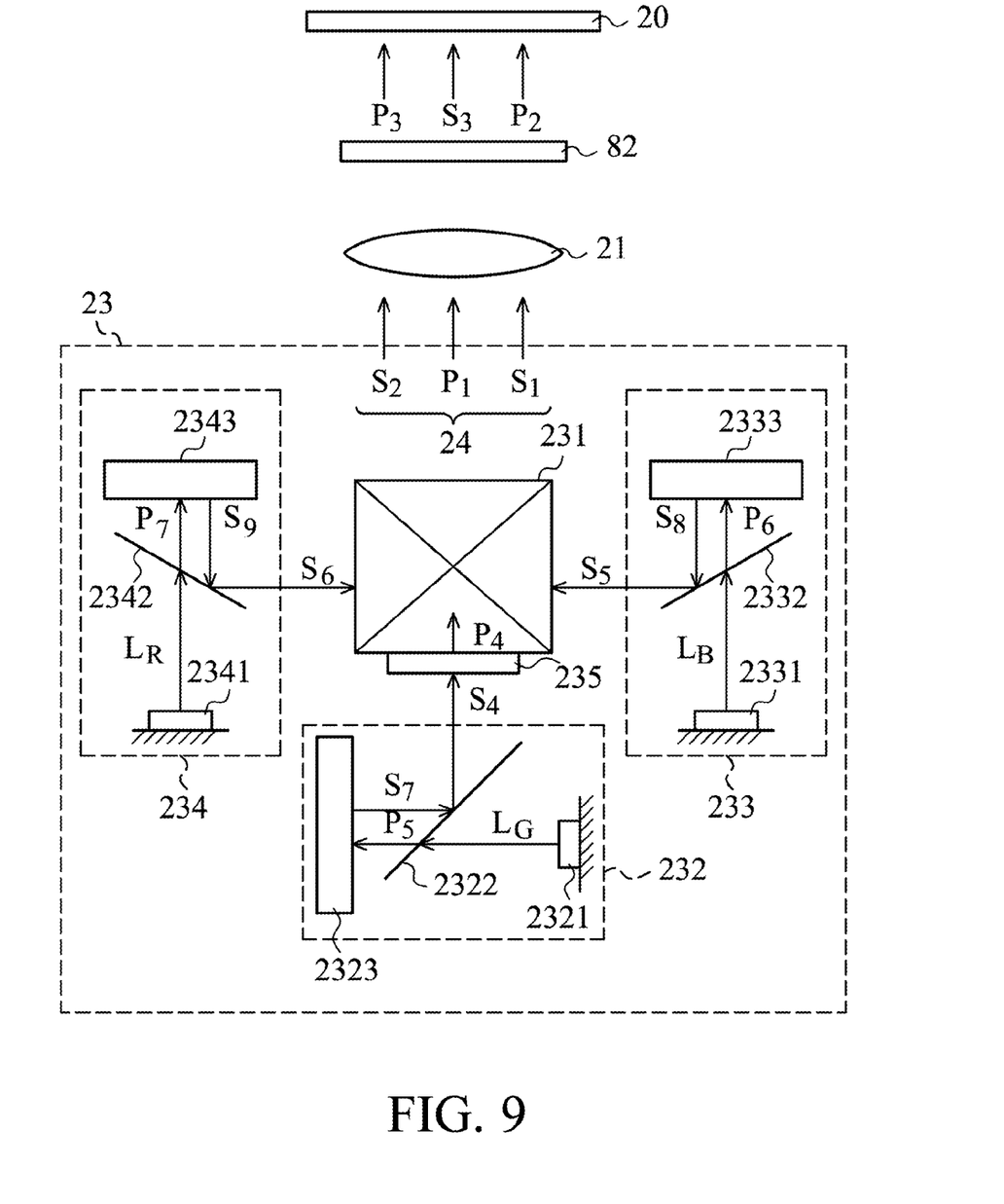
FIG. 9 is a block diagram of an optical projection device of another embodiment of the invention.

FIG. 8 is a schematic view of an optical projection device of another embodiment of the invention. The optical projection device 800 comprises a lens 21, a first wave plate 82 and a laser engine 23. The laser engine 23 generates light 24 to pass through the lens 21 and the first wave plate 82, forming into an image on a screen 20. The first wave plate 82 rotates around an axle parallel to a projecting direction of light 24 by a motor (not shown) to equalize the laser energy and delete the interference speckle on the screen 20. Referring to FIG. 9, the laser engine 23 comprises an X-prism 231, a first polarized light generator 232, a second polarized light generator 233, a third polarized light generator 234 and a second wave plate 235. The elements of the laser engine 23 are described as follows.

The first polarized light generator 232 comprises a green laser source 2321 to generate a green laser $L_G$ to pass through a first polarized spectroscope 2322 to generate a P polarized light $P_5$ reflected by a first reflecting panel 2323 to generate an S polarized light $S_7$. The S polarized light $S_7$ is reflected by the first polarized spectroscope 2322 to generate a P polarized light $P_4$. The P polarized light $P_4$ is transmitted from the first polarized light generator 232 to the second wave plate 235, and then passes through the second wave plate 235 to transform into a P polarized light $P_4$ and then enter the X-prism 231.

The second polarized light generator 233 comprises a blue laser source 2331 to generate a blue laser $L_B$ to pass through a second polarized spectroscope 2332 to generate a P polarized light $P_6$ reflected by a second reflecting panel 2333 to generate an S polarized light $S_8$. The S polarized light $S_8$ is reflected by the second polarized spectroscope 2332 to generate an S polarized light $S_5$. The S polarized light $S_5$ is transmitted from the second polarized light generator 233 to the X-prism 231, and enters the X-prism 231.

The third polarized light generator 234 comprises a red laser source 2341 to generate a red laser $L_R$ to pass through a third polarized spectroscope 2342 to generate a P polarized light $P_7$ reflected by a third reflecting panel 2343 to generate an S polarized light $S_9$. The S polarized light $S_9$ is reflected by the third polarized spectroscope 2342 to generate an S polarized light $S_6$. The S polarized light $S_6$ is transmitted from the third polarized light generator 234 to the X-prism 231, and enters the X-prism 231.

The X-prism 231 integrates the P polarized light $P_4$ generated by the first polarized light generator 232, the S polarized light $S_5$ generated by the second polarized light generator 233 and the S polarized light $S_6$ generated by the third polarized light generator 234 into light to radiate. Light 24 comprises a P polarized light $P_1$, an S polarized light $S_1$, and an S polarized light $S_2$.

After light 24 radiated by the laser engine 23 passes through the lens 21 for focus, light 24 passes through the first wave plate 62 to transform the P polarized light $P_1$ to an S polarized light $S_3$, the S polarized light $S_1$ to a P polarized light $P_2$, and the S polarized light $S_2$ to a P polarized light $P_3$. Finally, an image is formed on the screen 20.

During operation, the optical projection device 800 utilizes the first wave plate 82 to quickly move to change the angle between the light 24 and the axle of the first wave plate 82, to change the direction of the electric field when light 24 moves. Thus, laser energy is equalized following variations of the interference position. Further, the interference speckle on the screen 20 is eliminated. Moreover, providing the laser source can reduce the quantity of the optical elements and the volume of the projector. Cost is decreased and the efficiency of production and assembly is increased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical projection device, comprising:
   a laser engine, comprising an X-Prism, a second wave plate, a first polarized light generator, a second polarized light generator, and a third polarized light generator, wherein the first polarized light generator generates a fourth S polarized light to pass through the second wave plate to generate a fourth P polarized light, the second polarized light generator generates a fifth S polarized light, the third polarized light generator generates a sixth S polarized light, and the X-prism integrates the fourth P polarized light, the fifth S polarized light and the sixth S polarized light into light, wherein light comprises a first P polarized light, a first S polarized light, and a second S polarized light;
   a first wave plate, changing a light phase, wherein after light passes through the first wave plate, the first P polarized light is transformed to a third S polarized light, the first S polarized light is transformed to a second P polarized light, and the second S polarized light is transformed to a third P polarized light; and
   a lens, focusing light.

2. The optical projection device as claimed in claim 1, wherein light passes through the lens and then passes through the wave plate.

3. The optical projection device as claimed in claim 1, wherein light passes through the wave plate and then passes through the lens.

4. The optical projection device as claimed in claim 1, wherein the first polarized light generator comprises a green laser source, a first polarized spectroscope and a first reflecting panel, the green laser source generates a green laser to pass through the first polarized spectroscope to generate a fifth P polarized light, the fifth P polarized light is reflected by the first reflecting panel to generate a seventh S polarized light, and the seventh S polarized light is reflected by the first polarized spectroscope to generate the fourth S polarized light.

5. The optical projection device as claimed in claim 1, wherein the second polarized light generator comprises a blue laser source, a second polarized spectroscope and a second reflecting panel, the blue laser source generates a blue laser to pass through the second polarized spectroscope to generate a sixth P polarized light, the sixth P polarized light is reflected by the second reflecting panel to generate an eighth S polarized light, and the eighth S polarized light is reflected by the second polarized spectroscope to generate the fifth S polarized light.

6. The optical projection device as claimed in claim 1, wherein the third polarized light generator comprises a red laser source, a third polarized spectroscope and a third reflecting panel, the red laser source generates a red laser to pass through the third polarized spectroscope to generate a seventh P polarized light, the seventh P polarized light is reflected by the third reflecting panel to generate an ninth S polarized light, and the ninth S polarized light is reflected by the third polarized spectroscope to generate the sixth S polarized light.

7. A projecting method of an optical projection device, the steps comprising:
   providing a laser engine, comprising an X-Prism, a second wave plate, a first polarized light generator, a second polarized light generator, and a third polarized light generator, wherein the first polarized light generator generates a fourth S polarized light to pass through the second wave plate to generate a fourth P polarized light, the second polarized light generator generates a fifth S polarized light, the third polarized light generator generates a sixth S polarized light, and the X-prism integrates the fourth P polarized light, the fifth S polarized light and the sixth S polarized light into light;
   providing light including a first P polarized light, a first S polarized light, and a second S polarized light;
   projecting light through a wave plate on a screen, wherein after light passes through the wave plate, the first P polarized light is transformed to a third S polarized light, the first S polarized light is transformed to a second P polarized light, and the second S polarized light is transformed to a third P polarized light; and
   rotating the wave plate around an axle parallel to a projecting direction of light.

8. The projecting method as claimed in claim 7, wherein light passes through a lens and then passes through the wave plate.

9. The projecting method as claimed in claim 7, wherein light passes through the wave plate, then passes through a lens, and then projects on the screen.

* * * * *